United States Patent
Arnold et al.

(10) Patent No.: US 11,460,859 B2
(45) Date of Patent: Oct. 4, 2022

(54) SYSTEM COMPRISED OF A FLOOR PROCESSING DEVICE GUIDED MANUALLY, AN EXCLUSIVELY AUTOMATICALLY OPERATED FLOOR PROCESSING DEVICE AND A COMPUTING DEVICE

(71) Applicant: Vorwerk & Co. Interholding GmbH, Wuppertal (DE)

(72) Inventors: Hans-Peter Arnold, Kierspe (DE); Thomas Buening, Bochum (DE); Benjamin Fleczok, Essen (DE); Robert Frielinghaus, Bochum (DE); Martin Helmich, Duisburg (DE); Lorenz Hillen, Wuppertal (DE); Christian Holz, Dortmund (DE); Gerhard Isenberg, Cologne (DE); Andrej Mosebach, Bochum (DE); Roman Ortmann, Duisburg (DE); Kevin Schmitz, Duesseldorf (DE); Fabian Vitz, Wuppertal (DE); Niklas Van Teeffelen, Duesseldorf (DE); Uwe Kemker, Wuppertal (DE); Georg Hackert, Wilen bei Wollerau (CH)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 353 days.

(21) Appl. No.: 16/837,157

(22) Filed: Apr. 1, 2020

(65) Prior Publication Data
US 2020/0323412 A1    Oct. 15, 2020

(30) Foreign Application Priority Data
Apr. 11, 2019    (DE) .................... 10 2019 109 596.4

(51) Int. Cl.
*G05D 1/02* (2020.01)
*A47L 11/40* (2006.01)

(52) U.S. Cl.
CPC ........ *G05D 1/0276* (2013.01); *A47L 11/4011* (2013.01); *A47L 11/4061* (2013.01); *G05D 2201/0203* (2013.01)

(58) Field of Classification Search
CPC .......... G05D 1/0276; G05D 2201/0203; A47L 11/4011; A47L 11/4061; A47L 9/2826; (Continued)

(56) References Cited

U.S. PATENT DOCUMENTS

2012/0152280 A1* 6/2012 Bosses ................. A47L 9/2805
134/6
2015/0335219 A1* 11/2015 Noh ..................... A47L 9/2857
15/319

(Continued)

FOREIGN PATENT DOCUMENTS

EP    3 345 524 A1    7/2018

*Primary Examiner* — Ryan Rink
(74) *Attorney, Agent, or Firm* — Collard & Roe, P.C.

(57) ABSTRACT

A system has a first floor processing device guided manually by a user within an environment, a second, exclusively automatically operated floor processing device, and a computing device. The first floor processing device has a detection device for detecting a parameter of the environment and/or a surface to be processed, and the second floor processing device has a navigation device for navigating and self-localizing in the environment. In order to enable an optimal floor processing of the environment with as little assistance by the user as possible, the computing device is set up, based on the parameter detected by the detection device of the first floor processing device, to determine (Continued)

whether a specific partial surface area of the surface to be processed is suitable for floor processing by the second floor processing device.

7 Claims, 4 Drawing Sheets

(58) Field of Classification Search
CPC .. A47L 9/2857; A47L 2201/00; G01C 21/206
See application file for complete search history.

(56) References Cited

U.S. PATENT DOCUMENTS

| | | | | |
|---|---|---|---|---|
| 2017/0296007 | A1* | 10/2017 | Warren | A47L 5/24 |
| 2018/0074508 | A1* | 3/2018 | Kleiner | G05D 1/0219 |
| 2018/0344114 | A1* | 12/2018 | Scholten | G05D 1/0291 |
| 2019/0167059 | A1* | 6/2019 | Brown | A47L 9/2805 |
| 2019/0179333 | A1* | 6/2019 | Noh | G06V 10/462 |
| 2019/0320866 | A1* | 10/2019 | Thorne | B25J 11/0085 |
| 2020/0022546 | A1* | 1/2020 | Conrad | A47L 9/1683 |
| 2020/0049514 | A1* | 2/2020 | Grandi | G05D 1/0088 |
| 2020/0100639 | A1* | 4/2020 | Ullmann | G05B 19/19 |
| 2021/0038041 | A1* | 2/2021 | Pruiett | A47L 9/19 |

* cited by examiner

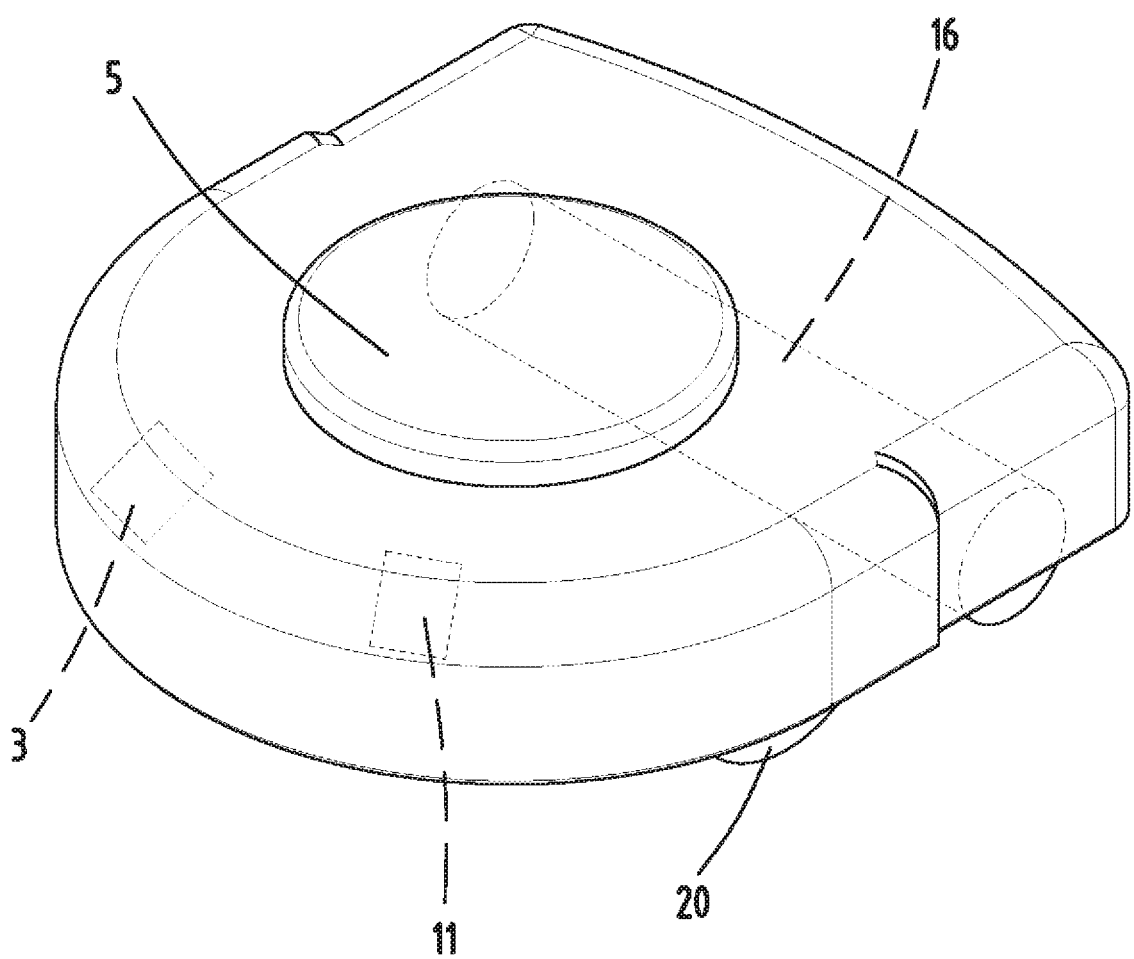

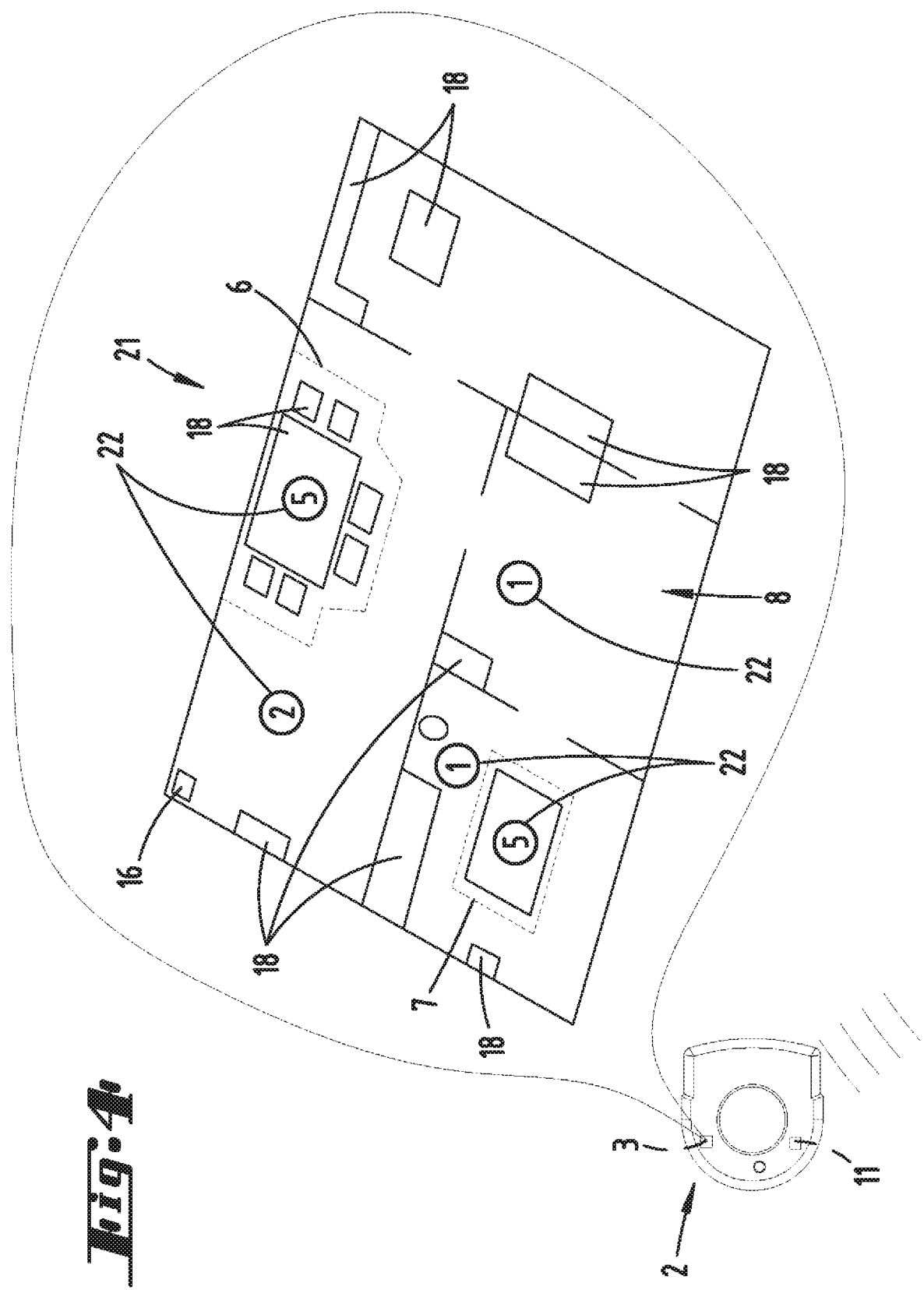

SYSTEM COMPRISED OF A FLOOR PROCESSING DEVICE GUIDED MANUALLY, AN EXCLUSIVELY AUTOMATICALLY OPERATED FLOOR PROCESSING DEVICE AND A COMPUTING DEVICE

CROSS REFERENCE TO RELATED APPLICATIONS

Applicant claims priority under 35 U.S.C. § 119 of German Application No. 10 2019 109 596.4 filed Apr. 11, 2019, the disclosure of which is incorporated by reference.

BACKGROUND OF THE INVENTION

1. Field of the Invention

The invention relates to a system comprised of a first floor processing device guided manually by a user within an environment, a second, exclusively automatically operated floor processing device, and a computing device, wherein the first floor processing device has a detection device for detecting a parameter of the environment and/or a surface to be processed, and wherein the second floor processing device has a navigation device for navigating and self-localizing in the environment.

2. Description of the Related Art

Floor processing devices are known in the art as devices that are manually guided by a user or move automatically. In addition, it is further known to operate a system comprised of several floor processing devices, for example within a household, and make complementary use of the advantages offered by manually guided floor processing and automatically operated floor processing.

For example, floor processing devices within the meaning of the invention can be cleaning devices such as vacuum cleaners and/or wet mopping devices, or polishing devices, waxing devices, grinding devices, lawnmowers or the like. Floor processing devices manually guided by a user are usually characterized by a stalk and/or handle, with which the user can guide the floor processing device over a surface to be processed, for example a floor surface or above-floor surface. The automatically operated floor processing devices are have a navigation device for automatic orientation and localization within an environment, preferably based on an area map, wherein the automatic floor processing device can automatically travel within the environment, navigates based on the area map, and possibly performs floor processing activities in the process.

For example, known from EP 3 345 524 A1 is a system comprised of two or more floor processing devices, which move over a surface to be processed and process the latter as a function of a surface parameter of the surface, wherein detected surface parameters and corresponding device parameters are stored in a shared database, which the floor processing devices access and can store and/or select a device parameter and/or surface parameter for a floor processing operation to follow at a later time.

SUMMARY OF THE INVENTION

Proceeding from the aforementioned prior art, the object of the invention is to further develop a system comprised of a manually guided floor processing device and an automatically operated floor processing device in such a way that an optimal processing result and/or an optimal processing strategy can be achieved.

In order to achieve the aforementioned object, the invention proposes that the computing device of the system be set up, based on the parameter detected by the detection device of the first floor processing device, to determine whether a specific partial surface area of the surface to be processed is suitable for floor processing by the second floor processing device.

According to the invention, the computing device is now designed, based on the data recorded by means of the first floor processing device, to determine whether a specific partial surface could be cleaned with the second floor processing device in addition to or instead of the first floor processing device. The computing device can be a local computing device of the first or second floor processing device, or alternatively a computing device designed separately from the floor processing devices, for example which is arranged in a mobile terminal of the user, a stationary PC, a remote server or the like. For purposes of communication between the computing device and floor processing devices, the system preferably has a communications network, in particular a wireless communications network, for example a WLAN. While the user manually guides the first floor processing device over the surface to be processed, the detection device of the first floor processing device detects one or several parameters of the environment or the surface to be processed. These data can already be processed by means of the computing device while using the first floor processing device or even after a floor processing activity has concluded, so as to evaluate the recorded parameters with the aim of determining whether one or several partial surface areas of the environment are suitable for floor processing by the second, specifically the exclusively automatically operated floor processing device. In this way, the environment of the system can be divided into partial surface areas that are only suitable for floor processing by the first floor processing device, only suitable for floor processing by the second floor processing device, or for floor processing by both the first floor processing device and by the second floor processing device. The computing device can further have an area map, in which the partial surface areas are defined, and which stores the floor processing device(s) of the system suitable for floor processing the respective partial surface area. The partial surface areas that can be processed by the automatically operated second floor processing device are preferably actually also processed by the second floor processing device, so that the user only has to perform a manual floor processing by means of the first floor processing device in as few partial surface areas as possible. In particular, this saves the user floor processing time in the environment, because so many floor processing steps as possible are taken over automatically by the second floor processing device.

It is proposed that the parameter detected by the detection device of the first floor processing device be a parameter of the partial surface area that limits and/or prevents the floor processing and/or navigability of the partial surface area. In particular, the parameter can be a floor type, a contamination type, a contamination level, a contamination frequency and/or a standing or hanging obstacle. The detected parameters differentiate partial surface areas in which floor processing by the second floor processing device is possible from partial surface areas in which a floor processing by the second floor processing device is not possible. For example, it is possible that a floor type, a contamination type, a contamination level, a contamination frequency and/or an obstacle relating to the respective partial surface area precisely preclude a floor processing by the second floor processing device, for example since the second floor processing device is not suitable owing to its spatial dimension, its available processing capacity or other device parameters. For example, the "floor type" parameter can be classified into a hard floor, carpeted floor, carpet, high-pile carpet or carpeted floor, low-pile carpet or carpeted floor, easily movable carpets or runners. For example, the "contamination type" parameter can be divided into coarse material, fine material, dust, food residue, sticky contaminants, liquids or the like. The "contamination level" parameter can be divided into various contamination levels, such as not contaminated, slightly contaminated, moderately contaminated, excessively contaminated, highly contaminated. Of course, the contamination level can be subdivided even more finely. The "contamination frequency" parameter indicates how often a floor processing or cleaning should take place with the floor processing device. For example, contamination can be noted very frequently in front of a kitchen worktop or under a dining table, so that floor processing is likewise to also take place very frequently in this partial surface area. The computing device of the system can then determine whether the automatically operating floor processing device is available for such frequent assignments, in particular taking into consideration an accumulator charge. In addition, a detected parameter preferably also includes the presence or absence of an obstacle in or above the partial surface in question, wherein the detected obstacle in particular can preclude a navigability or floor processing by the second floor processing device, for example because the floor processing device cannot even travel into the partial surface area at all, or would bump up against an obstacle standing or hanging over the partial surface area. For example, the detection device for recording these parameters can be a camera, a distance sensor, a contact sensor, a particle sensor, a detection device for detecting a power consumption of a drive motor of the floor processing device or the like.

It is further proposed that the computing device be set up to calculate a metric characteristic for a specific partial surface area from at least one detected parameter. The preferably dimensionless metric enables a comparability of the detection results in various partial surface areas of the environment or even in the same partial surface area and different points in time. The characteristic metric can be calculated from only a single detected parameter, or even from several detected parameters. With respect to a contamination level, for example, a contamination can be indicated with a contamination level of between "1" and "5". If the detected parameter involves a floor type, the latter can also be represented as a metric for an intensity of floor processing in stages of 1 to 5, from "1" for "easy to clean" to "5" for "hard to clean". For example, a hard floor would get the number "1", while a high-pile carpeted floor is rated a "5". The lower the metric, even a metric that depends on various parameters, the more likely the partial surface area is suitable for processing by the automatic, second floor processing device. Given a metric of "1", the second floor processing device is suitable without limitation to initiate the floor processing of this partial floor area. Given a metric of "5", a successful floor processing by the second floor processing device is precluded. The computing device thus generates a type of index for one or several partial surface areas of the surface to be processed that expresses whether a partial surface area would be suitable to be cleaned by means of the second floor processing device. For example, typical indicators denoting that a partial surface area can be processed by means of the second floor processing device include a noncritical floor covering that requires no deep cleaning, or a largely obstacle-free surface that is easy for the second floor processing device to clean. For example, a parameter that can likewise be used as the basis for measuring the processing capability of the second floor processing device also involves whether partial surface areas are geometrically correlated in such a way that the latter can be processed one right after the other, without having to cross over partial surface areas that are not accessible for processing by the second floor processing device.

It is further proposed that the characteristic metric additionally be dependent on a parameter of the second floor processing device. For example, this type of parameter of the second floor processing device can be its height over a floor surface, width, volume, geometric shape, available work accessories, available performance levels, available charge status of an accumulator or the like. In particular, the parameter of the second floor processing device can be a characteristic device parameter and/or processing parameter of the second floor processing device. As a consequence, the metric, i.e., simultaneously also the processing capability, of the defined partial surface area depends not only on the parameters of the partial surface area, but rather also on one or several parameters of the second floor processing device, which is potentially to be used for the floor processing of this partial surface area.

In particular, it is proposed that the first floor processing device be set up to transmit information to the second floor processing device indicating that the determined partial surface area is suitable for floor processing by the second floor processing device. The first floor processing device manually guided by a user thus informs the automatically operated second floor processing device, in particular based upon the metrics described above, which partial surface areas can be processed by the second floor processing device. The second floor processing device can subsequently process these partial surface areas. If necessary, an advantageous floor processing sequence for several partial surface areas can here be determined. Alternatively or additionally, it can be provided that the second floor processing device be set up to transmit information to the first floor processing device as to whether the determined partial surface area is suitable for floor processing by the second floor processing device. According to this configuration, while performing a floor processing activity, or in particular even in advance, the second floor processing device can determine that it is having problems in the floor processing of specific partial surface areas. For example, these partial surface areas can also be those which the computing device has previously classified as suitable for a floor processing by the second floor processing device. The second floor processing device can notify the first floor processing device about these partial surface areas. In particular, a separate computing device of the second floor processing device can also use the detection data of the first floor processing device to determine which partial surface areas can be very well processed by the floor processing device. The second floor processing device can autonomously process the latter in the future.

In this conjunction, it is proposed in particular that the second floor processing device have a computing device, which is set up to consider information of the first floor processing device during a navigation by means of the navigation device and/or given an activity planned in advance based on an activity calendar, so that the second floor processing device processes the defined partial surface area. According to one embodiment, the automatically operated second floor processing device has an activity calendar, in which future processing activities for the floor processing device are planned. For example, this calendar can have floor processing activities stored by date and/or time of day, which are to be performed by the second floor processing device once or even repeatedly. For example, a planned activity can involve cleaning a nursery every Monday morning at 10 a.m. If the computing device determines partial surface areas of an environment that can be cleaned by means of the second floor processing device, information relating thereto is transmitted to the second floor processing device, so that a corresponding entry can be made into the activity calendar. A contamination frequency ascertained beforehand by means of the detection device of the first floor processing device can be used to determine a preferred repetition of the floor processing activity. The second floor processing device then approaches the partial surface areas that it can process, either immediately or based on a planned use and/or path map.

It is further proposed that the first floor processing device have a user interface, which indicates to the user that a specific partial surface area of the surface to be processed, in particular a partial surface area currently being traversed by the first floor processing device, is suitable for floor processing by the second floor processing device. According to this embodiment, while manually floor processing a partial surface area, the first floor processing device operated by the user lets him or her know when a partial surface area suitable for the second floor processing device is being processed, so that he or she can terminate the floor processing operation and turn to those partial surface areas that instead cannot be processed by the second floor processing device, but require a manual floor processing by the first floor processing device. This embodiment is especially advantageous, since the user then only manually cleans those partial surface areas which can actually not be processed by the second floor processing device. This makes it possible to significantly reduce the outlay for the user, and a larger portion of the floor processing operations to be performed can automatically be handled by the second floor processing device. For example, the user interface of the first floor processing device can be a display that outputs a message in text and/or image form. In addition, the user interface can also be an acoustic output device, for example which plays a tone or tone sequence if the partial surface area is one that can be processed by the second floor processing device. In addition, the user interface can also be a communications interface over which the first floor processing device can transmit data to an external terminal of the user, for example to a mobile terminal such as a mobile phone, a tablet computer or the like.

Finally, it can be provided that the second floor processing device be set up, in the event that a floor processing operation by the second floor processing device fails, to transmit information to the first floor processing device that the specific partial surface area cannot be processed by means of the second floor processing device. According to this embodiment, the second floor processing device can also transmit information to the first floor processing device, specifically in the sense that information to the effect that a specific partial surface area could not be processed is transmitted to the first floor processing device or correspondingly also to the user. Based on this information, the user is informed that he or she should process this partial floor area manually by means of the first floor processing device.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows a magnified view of the second floor processing device; and

FIG. 4 shows the second floor processing device with an area map, in which characteristic metrics for specific partial surface areas are stored.

DETAILED DESCRIPTION OF PREFERRED EMBODIMENTS

Figure 1:
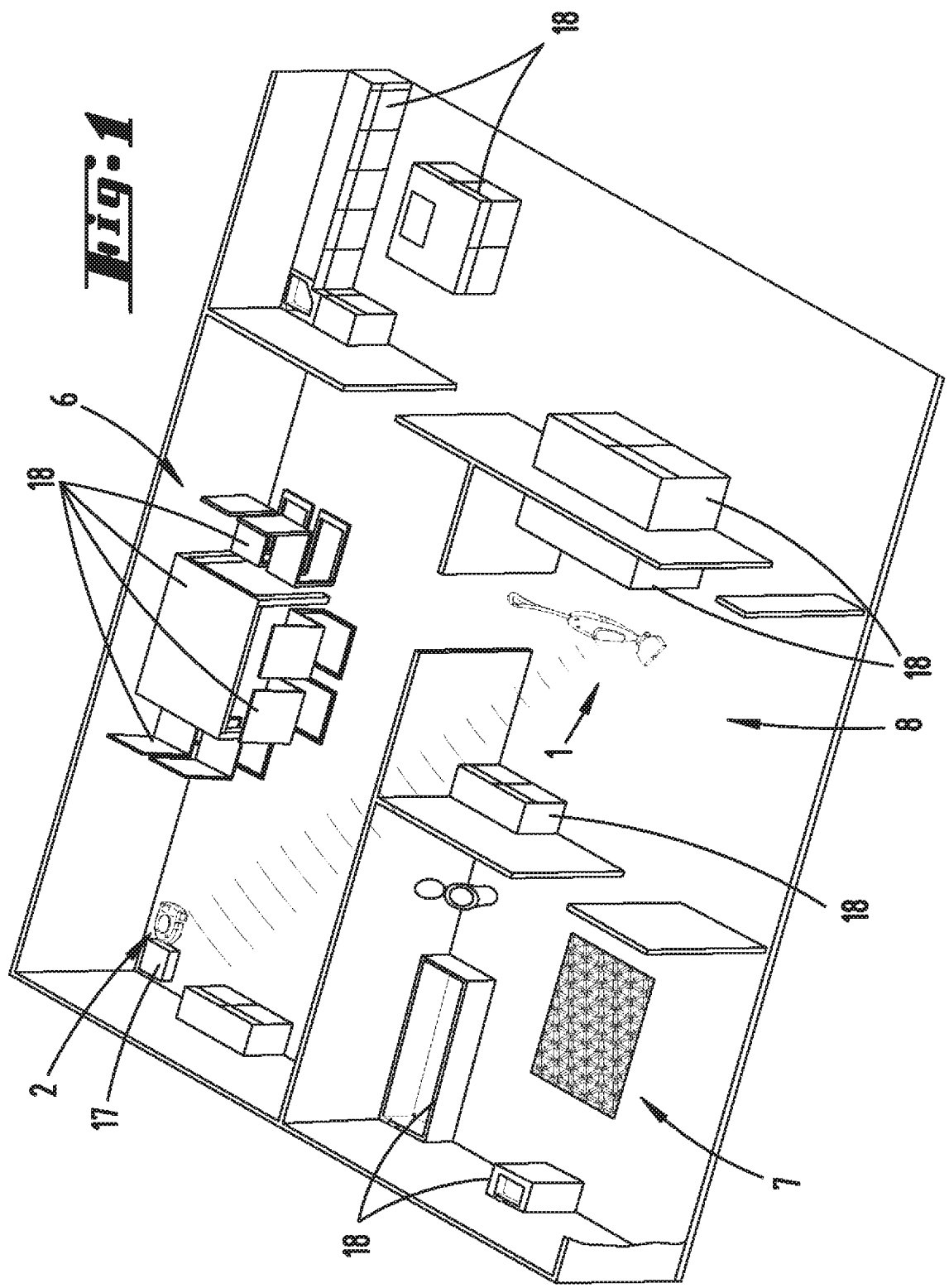
FIG. 1 shows an environment with a system comprised of a first floor processing device and a second floor processing device.

FIG. 1 presents a schematic layout of a home with several rooms. Located in the home are a first floor processing device 1 guided exclusively manually by a user and an exclusively automatically operated second floor processing device 2. For example, the first floor processing device 1 is here a hand guided vacuum cleaner, which will be described in more detail with reference to FIG. 2. For example, the automatically operated floor processing device 2 is here a robotic vacuum cleaner, which is depicted in more detail with reference to FIG. 3.

The environment of the floor processing devices 1, 2 consists of the usual spatial boundaries, such as walls and other obstacles 18. Among other things, the obstacles 18 include furniture, such as a table with a plurality of rocking chairs. Also located in the environment is a base station 17 for the automatically operated second floor processing device 2. This base station 17 has facilities and means for performing service activities on the automatically operated second floor processing device 2, or possibly additional floor processing devices 1, 2 as well. For example, the service activities include charging the accumulator of a floor processing device 1, 2, emptying a dust collection chamber of a floor processing device 1, 2, cleaning a floor processing element 16 (e.g., see FIG. 3) of a floor processing device 1, 2 or the like.

A plurality of different partial surface areas 6, 7, 8 of a floor surface to be cleaned exist in the rooms of the environment. The partial surface areas 6, 7, 8 are characterized by varying parameters, for example including by the floor type of the partial surface area 6, 7, 8 to be cleaned or obstacles 18 located in this area. For example, the different rooms are here a bathroom, a hallway, a dining room and a kitchen. The dining room includes a partial surface area 6 having an arrangement comprised of a table with several chairs. Among other things, the bathroom has a partial surface area 7 comprised of an easily movable bathmat. Only immovable obstacles 18 (furniture items) are located in the hallway, with the partial surface area 8 therein otherwise being free of obstacles, and the floor covering consisting of an easily cleaned hard floor. The same holds true for the adjacent kitchen.

Figure 2:
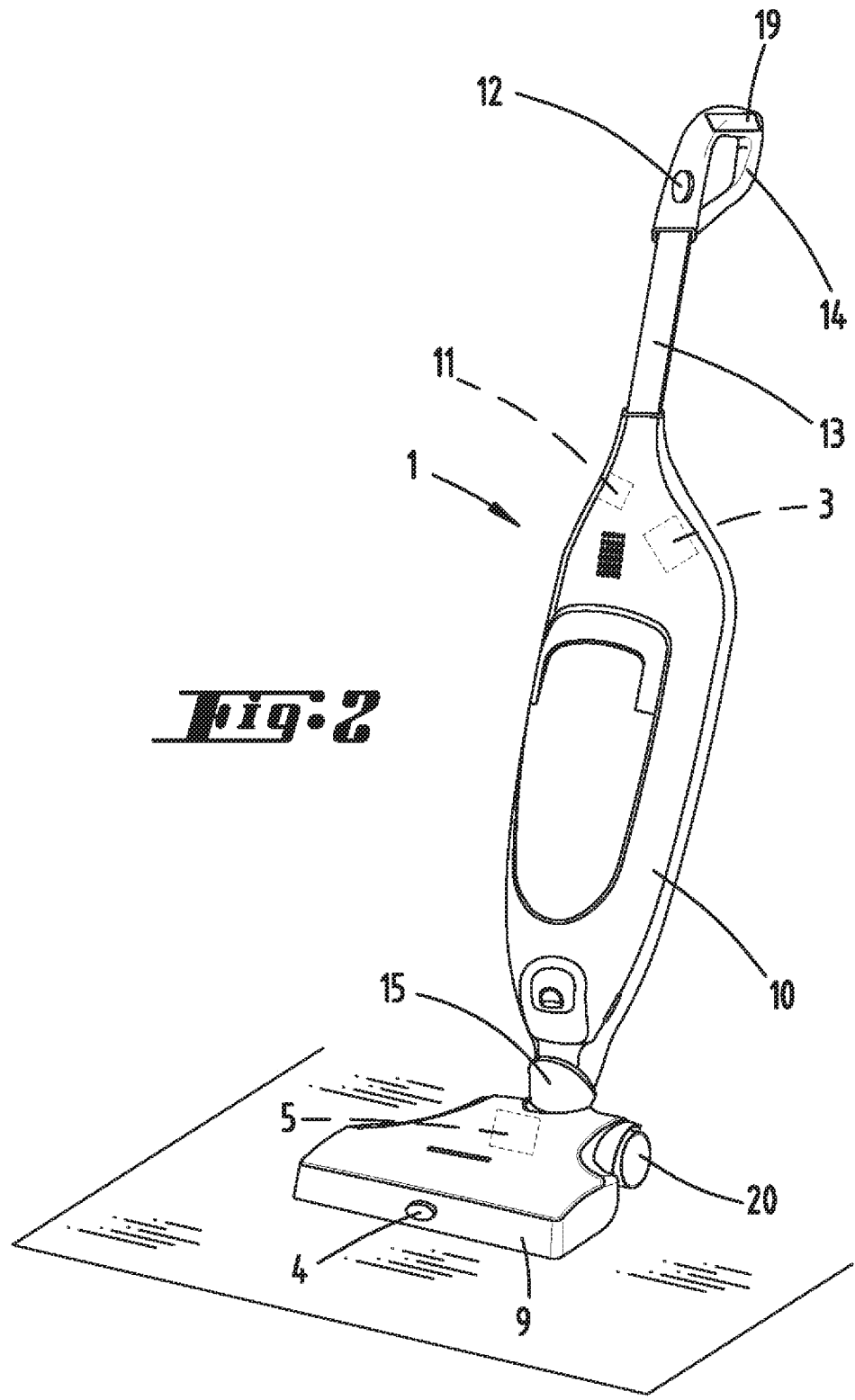
FIG. 2 shows a magnified view of the first floor processing device.

According to FIG. 2, the floor processing device 1 manually guided by a user has a base device 10 and a floor nozzle 9 detachably connected with the base device 10 via a connecting area 15. For example, the floor nozzle 9 here involves a suction nozzle with a cleaning brush at the bottom (not shown), which comprises a floor processing element 16. The floor nozzle 9 has wheels 20, so as to be able to move the floor processing device 1 as a whole over the floor surface to be cleaned with little resistance. The wheels 20 or also the floor processing element 16 can be driven by a motor, so as to support the movement of the floor processing device 1 and facilitate handling by the user. The base device 10 has a stalk 13 with a handle 14. A switch 12 is arranged on the handle 14, and is used to turn a vacuum cleaner (not shown here in more detail) on and off. In addition, the switch can be used to set various suction power levels of the vacuum cleaner. Also provided on the handle 14 is a user interface 19 in the form of a display. The user interface 19 can display messages to the user via text and/or image. The floor processing device 1 further has a detection device 4, which is here a camera arranged on a floor nozzle 9. The camera records images of the environment, in particular to include the obstacles 18 and the floor surface to be cleaned. For example, the floor nozzle 9 here further has a localization device or navigation device 5, which can be used to localize the floor processing device 1 within the environment. As a result, the images recorded by the detection device 4 can be allocated to a specific location in the environment. In order to link the images with the locations in the environment, the floor processing device 1 has a computing device 3, for example which here is arranged in the base device 10. The computing device 3 can localize the floor processing device 1 using the images of the detection device 4, for example, and/or also the measured data of an inertial sensor (not shown here), for example, which is allocated to the wheels 20 of the floor nozzle 9, or the measured data of another sensor. For example, the inertial sensor detects the wheel rotation of the wheels 20, making it possible to infer a distance covered by the floor processing device, and possibly a change in direction of the floor processing device 1 as it moves through the environment. The computing device 3 is further used to evaluate the camera images recorded by the detection device 4, so as to evaluate parameters of the detected floor surface in the environment. Based on the parameters detected by the detection device 4, for example, the computing device 3 can determine whether the partial surface areas 6, 7, 8 of the environment are suitable for cleaning by the automatically operated second floor processing device 2. For example, the second floor processing device 2 might not be suitable for cleaning purposes if a partial surface area 6, 7, 8 has a plurality of closely adjacent obstacles 18, between which the second floor processing device 2 cannot travel. In addition, the type of floor covering may also make the second floor cleaning device 2 unsuitable for cleaning purposes.

The first floor processing device 1 further has a communications module 11, which is used to communicate with a corresponding communications module 11 of the second floor processing device 2, and in particular to transmit information to the second floor processing device 2 to the effect that a specific partial surface area 6, 7, 8 is suitable or unsuitable for floor processing by the second floor processing device 2. Information can likewise be transmitted in the reverse direction, i.e., from the second floor processing device 2 to the first floor processing device 1. For example, the communications modules 11 are here WLAN modules, which allow wireless communication between the floor processing devices 1, 2 of the system. Even though only two floor processing devices 1, 2 are here exemplarily shown, the system can also have a plurality of additional floor processing devices 1, 2.

The automatically operated second floor processing device 2 shown in more detail on FIG. 3 has motor-driven wheels 20 as well as a floor processing element 16, for example which is here designed as a rotating bristle roller, whose longitudinal extension is oriented essentially horizontal to a floor surface to be cleaned. The second floor processing device 2 has a communications module 11, for example here designed as a WLAN module, so as to be able to receive the information of the first floor processing device 1 and/or transmit information to the first floor processing device 1. The second floor processing device 2 further has a computing device 3, which is set up to evaluate the information of the first floor processing device 1 and convert it into control commands, to also include control commands for a navigation device 5 of the second floor processing device 2. The navigation device 5 is used by the second floor processing device 2 to automatically traverse the environment. For example, the navigation device 5 can have allocated to it a distance measuring device, for example a laser scanner, which preferably can detect distances from obstacles 18 within a 360° angular range. The computing device 3 processes the measured distance data into an area map 21 exemplarily shown on FIG. 4, which contains a layout of the environment, i.e., here the rooms in a home, locations of obstacles 18 including spatial boundaries, the position of the base station 17 and the like. The area map 21 is used for navigating and self-localizing the second floor processing device 2 within the environment. For example, the floor processing device 2 can use a so-called SLAM (simultaneous localization and measurement algorithm) to generate the area map 21.

The area map 21 according to FIG. 4 further contains information about parameters of the partial surface areas 6, 7, 8 in the environment. Metrics 22 are allocated to the partial surface areas 6, 7, 8, which indicate whether the allocated partial surface area 6, 7, 8 is suitable for a floor processing by the automatically operated second floor processing device 2. For example, metrics 22 of "1" to "5" are here adequate, thereby providing a total of five different levels for determining the suitability for processing by the second floor processing device 2. The metric "1" here means that it is easily possible to clean the corresponding partial surface area 6, 7, 8 by means of the second floor processing device 2. For example, such partial surface areas 6, 7, 8 here are hard floors, in particular tile floors, which can be readily cleaned by the second floor processing device 2. For example, the metric "2" stands for partial surface areas 6, 7, 8 that have a wood floor, and are basically just as easy to clean (but should not be excessively wet cleaned, for example). By contrast, the metric "5" denotes hard to clean partial surface areas 6, 7, 8, which all but preclude a cleaning by the second floor processing device 2. For example, these include a bathmat present in the partial surface area 7, which cannot be overcome by the second floor processing device 2, or a partial surface area 6 combining a dining table with a plurality of rocking chairs arranged around the latter, the pedestals of which the second floor processing device 2 is unable or not intended to overcome. The metrics 22 of the partial surface areas 6, 7, 8 are determined by the computing device 3 of the first floor processing device 1. This will be explained in further detail below.

The following explanations only serve as examples for the use of a system according to the invention. It here goes without saying that the floor processing devices 1, 2 can also be configured differently, for example not only as vacuum cleaning apparatuses, but for example also as mopping devices, polishing devices or the like. The specific type of floor processing device 1, 2 does not alter how the system functions. Apart from the two floor processing devices 1, 2 described here, the system can further also have a plurality of additional floor processing devices 1, 2 or other devices, such as service robots, monitoring robots or the like, which do not perform any floor processing activities, but are communicatively linked with the described floor processing devices 1, 2 via a home network, and can provide data, in particular for generating the area map 21.

According to one possible embodiment, the invention functions in such a way that the user moves the first, here manually guided, floor processing device 1 through the environment shown on FIG. 1, which is essentially reproduced by the area map 21 according to FIG. 4. The user here follows a random path of movement to clean the partial surface areas 6, 7, 8 of the environment. During the movement, the detection device 4 of the first floor processing device 1 detects features of the environment, for example here specifically present obstacles 18 as well as parameters of the floor surface in the partial surface areas 6, 7, 8 (and others) of the environment. The parameters detected by the detection device are evaluated by means of the computing device 3 of the first floor processing device 1, wherein this evaluation alternatively could also be performed in a computing device 3 external to the first floor processing device 1, for example in a central server of a home network. Allocated to [sic]. As a further alternative, the calculations could also be performed in the computing device 3 of the second floor processing device 2. The parameters detected by the detection device 4 of the first floor processing device 1 indicate whether a floor processing and/or traversal of the respective partial surface areas 6, 7, 8 by the second floor processing device 2 is possible. Such a parameter can be the respective floor type, or for example also a contamination type present on the floor surface, a contamination level of the contamination, or the existence of a standing or hanging obstacle 18 that prevents the partial surface area 6, 7, 8 from being traversable by the second floor processing device 2.

In the example present here, for example, the computing device 3 of the first floor processing device 1 recognizes that the bathroom has a partial surface area 7 with a high-pile bathmat, which is too high to be overcome by the automatic, second floor processing device 2 and/or so lightweight that the second floor processing device 2 would move it relative to the floor underneath in any attempt at processing. The computing device 3 allocates the metric 22 "5" to this partial surface area 7 (as shown in more detail in the area map according to FIG. 4), which means that this partial surface area 7 cannot be processed by the second floor processing device 2. The computing device 3 of the first floor processing device 1 transmits the metric 22 to the second floor processing device 2, which enters it into the area map 21 by means of its own computing device 3, and considers it during a floor processing by the second floor processing device 2. Metrics 22 are likewise allocated to the additional partial surface areas 6, 8 of the environment. For example, the partial surface area 8 here belongs to a hallway of the home, and has a tile floor that is easily cleanable by the second floor processing device 2. For this reason, the partial surface area 8 receives the metric 22 "1". The dining room comprises a partial surface area 6 with a seating group consisting of a table and a plurality of rocking chairs, the pedestals of which cannot or should not be overcome by the second floor processing device 2. This partial surface area 6 is detected by the detection device 4, and receives the metric 22 "5" from the computing device 3, which denotes a partial surface area 6 that must or should not be processed by the second floor processing device 2. The floor surface otherwise present in the dining room aside from the partial surface area 6 receives the metric 22 "2", meaning that it can be processed by the second floor processing device 2. For example, this partial area is furnished with a wood floor, which is basically easy to clean, but must not be exposed to any elevated supply of liquid (e.g., mopping liquid), for example. In addition to the floor type or an arrangement of obstacles 18, the metric 22 of the respective partial surface area 6, 7, 8 can also include one or several additional parameters of the respective partial surface area 6, 7, 8, specifically for example as mentioned above a contamination type present there, a contamination level, a contamination frequency or others. The computing device 3 can then determine a characteristic metric 22 that considers all parameters for the respective partial surface area 6, 7, 8. The closer this metric 22 lies to the lowest metric 22 "1", the more unproblematic it would be for the second floor processing device 2 to be able to clean there. However, the closer the metric 22 lies to the metric 22 "5", the sooner this partial surface area 6, 7, 8 must not be processed by the second floor processing device. The metric 22 preferably also considers parameters of the second floor processing device 2, here specifically its spatial dimension, which determines whether the second floor processing device 2 can travel between obstacles 18 spaced a specific distance away from each other, or for example under an obstacle 18, e.g., such as a low sofa or bed. A characteristic device parameter can likewise be a rise height of the second floor processing device 2, for example which indicates whether the second floor processing device 2 can climb onto a low obstacle 18, such as a carpet.

The first floor processing device 1 transmits the calculated metrics 22 to the second floor processing device, 2, whereupon the second floor processing device 2 enters the metrics 22 into the area map 21. The second floor processing device 2 can consider the metrics 22 during a floor processing operation at a later time, and here for example adjust a use and/or path map in so as to leave out partial surface areas 6, 7 having the metric 22 "5" in the course of processing, while the partial surface area 8 is cleaned by means of the second floor processing device 2 without limitations. The automatically operated second floor processing device 2 can further perform floor processing operations according to a stored activity calendar, which contains activities planned in advance, for example to also include periodically recurring processing activities.

Parallel to transmitting the metrics 22 from the first floor processing device 1 to the second floor processing device 2, the user can be informed about parameters of a partial surface area 6, 7, 8 via the user interface 19 of the first floor processing device 1, for example. While manually cleaning these partial surface areas 6, 7, 8, for example, the user interface 19 already makes the user aware of the fact that he or she is currently cleaning a partial surface 6, 7, 8 that could alternatively also be cleaned with the second floor processing device 2. This gives the user the option of ending the manual cleaning of this partial surface area 6, 7, 8, and instead leave cleaning to the second floor processing device 2. This allows the user to effectively economize on time in processing the entire home.

On the other hand, the second floor processing device 2 can also transmit messages to the first floor processing device 1, for example specifically information about the occurrence of a problem during the automatic processing of a partial surface area 6, 7, 8. The first floor processing device 1 receives this information, and can then once again make the user aware of the existing problem via the user interface 19. For example, the user can then initiate manual floor processing in these partial surface areas 6, 7, 8. Instead of a display, for example, the user interface 19 can also have a data communications interface, over which a message is transmitted to an external terminal, for example a mobile telephone.

In addition, the second floor processing device 2, for example based on the area map 21, can transmit information to the first floor processing device 1 as to which partial surface areas 6, 7, 8 the second floor processing device 2 can process itself. In this sense, the second floor processing device 2 can recognize partial surface areas 6, 7, 8 that have an especially low metric 22 or form coherent areas, which can be achieved without having to overcome obstacles 18. The second floor processing device 2 can in the future approach these partial surface areas 6, 7, 8 autonomously, wherein the user then can be informed about the fact that these partial surface areas 6, 7, 8 were already cleaned automatically by the second floor processing device 2, and thus no longer require any manual cleaning by the user.

Although only a few embodiments of the present invention have been shown and described, it is to be understood that many changes and modifications may be made thereunto without departing from the spirit and scope of the invention.

REFERENCE LIST

1 First floor processing device
2 Second floor processing device
3 Computing device
4 Detection device
5 Navigation device
6 Partial surface area
7 Partial surface area
8 Partial surface area
9 Floor nozzle
10 Base device
11 Communication module
12 Switch
13 Stalk
14 Handle
15 Connecting area
16 Floor processing element
17 Base station
18 Obstacle
19 User interface
20 Wheel
21 Area map
22 Metric

What is claimed is:

1. A system comprising:
   a first floor processing device that is configured to be guided manually by a user within an environment, the first floor processing device having a detection device configured for detecting a parameter of the environment and/or a surface to be processed,
   a second, exclusively automatically operated floor processing device, the second floor processing device having a navigation device configured for navigating and self-localizing in the environment, and
   a computing device, which, based on the parameter detected by the detection device of the first floor processing device, is configured to determine whether a specific partial surface area of the surface to be processed is suitable for floor processing by the second floor processing device,
   wherein the computing device is configured to calculate a metric characteristic for a specific partial surface area from at least one detected parameter, wherein the metric characteristic is also dependent on a parameter of the second floor processing device, wherein the parameter of the second floor processing device is a characteristic device parameter and/or processing parameter of the second floor processing device, wherein the lower the metric, the more likely the partial surface area is suitable for processing by the second floor processing device, and the higher the metric, the more likely the partial surface area is not suitable for processing by the second floor processing device, or wherein the higher the metric, the more likely the partial surface area is suitable for processing by the second floor processing device, and the lower the metric, the more likely the partial surface area is not suitable for processing by the second floor processing device, and wherein the metric expresses whether the respective partial surface area is suitable to be cleaned by means of the second floor processing device.

2. The system according to claim 1, wherein the parameter detected by the detection device of the first floor processing device is a parameter of the partial surface area that limits and/or prevents the floor processing and/or navigability of the partial surface area.

3. The system according to claim 1, wherein the parameter detected by the detection device of the first floor processing device is a floor type, a contamination type, a contamination level, a contamination frequency and/or a standing or hanging obstacle.

4. The system according to claim 1, wherein the first floor processing device is set up to transmit information to the second floor processing device indicating that the determined partial surface area is suitable for floor processing by the second floor processing device and/or wherein the second floor processing device is set up to transmit information to the first floor processing device as to whether the determined partial surface area is suitable for floor processing by the second floor processing device.

5. The system according to claim 4, wherein the second floor processing device has a computing device that is set up to consider the information during a navigation by means of the navigation device and/or given an activity planned in advance based on an activity calendar, so that the second floor processing device processes the defined partial surface area.

6. The system according to claim 1, wherein the first floor processing device has a user interface, which is configured to indicate to the user that a specific partial surface area of the surface to be processed is suitable for floor processing by the second floor processing device.

7. The system according to claim 1, wherein the second floor processing device is set up, in an event that a floor processing operation by the second floor processing device fails, to transmit information to the first floor processing device that the specific partial surface area cannot be processed by the second floor processing device.

* * * * *